United States Patent
Kihara et al.

(10) Patent No.: US 12,017,529 B2
(45) Date of Patent: Jun. 25, 2024

(54) ACCELERATOR DEVICE

(71) Applicant: DENSO CORPORATION, Kariya (JP)

(72) Inventors: Noriyasu Kihara, Kariya (JP); Yasuhiro Otaka, Kariya (JP); Kenji Tominaga, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 17/981,771

(22) Filed: Nov. 7, 2022

(65) Prior Publication Data

US 2023/0056651 A1   Feb. 23, 2023

Related U.S. Application Data

(63) Continuation of application No. PCT/JP2021/027031, filed on Jul. 19, 2021.

(30) Foreign Application Priority Data

Jul. 29, 2020   (JP) .................................. 2020-127837

(51) Int. Cl.
 B60K 26/02   (2006.01)
(52) U.S. Cl.
 CPC ................................... B60K 26/02 (2013.01)
(58) Field of Classification Search
 None
 See application file for complete search history.

(56) References Cited

U.S. PATENT DOCUMENTS

| | | | | |
|---|---|---|---|---|
| 5,497,677 A | * | 3/1996 | Baumann | B60K 26/02 74/507 |
| 7,946,192 B2 | * | 5/2011 | Kim | B60K 26/02 74/513 |
| 2007/0193401 A1 | * | 8/2007 | Campbell | G05G 1/38 74/560 |

FOREIGN PATENT DOCUMENTS

CN   201511825   6/2010

* cited by examiner

*Primary Examiner* — Vicky A Johnson
(74) *Attorney, Agent, or Firm* — Nixon & Vanderhye P.C.

(57) ABSTRACT

In an accelerator device, a pedal is rotatable in an accelerator opening direction by a pedaling force of a pad. An arm connects the pedal to the pad. A biasing member biases the pedal in an accelerator closing direction via the arm. The arm has a shaft portion that is assembled to the pad, and the pad has a pair of support walls that rotatably support the shaft portion. The pair of support walls have wall surfaces facing each other, each of the which is provided with a bearing portion and a thickening portion. The thickening portion includes a curved surface or a slope surface having a surface area broader as a distance from the bearing portion increases.

7 Claims, 13 Drawing Sheets

ACCELERATOR DEVICE

CROSS REFERENCE TO RELATED APPLICATION

The present application is a continuation application of International Patent Application No. PCT/JP2021/027031 filed on Jul. 19, 2021, which designated the U.S. and claims the benefit of priority from Japanese Patent Application No. 2020-127837 filed on Jul. 29, 2020. The entire disclosures of all of the above applications are incorporated herein by reference.

TECHNICAL FIELD

The present disclosure relates to an accelerator device.

BACKGROUND

An accelerator device is installed on a floor of a vehicle body near a driver's seat, and has a pad that is stepped on by a driver. The pad is connected to a pedal via an arm. The pedal rotates in an accelerator opening direction by a pedaling force of the pad, and the pedal returns to an accelerator closing direction by a biasing force of a spring.

SUMMARY

An accelerator device according to an aspect of the present disclosure includes a pad configured to be stepped on by a driver, a pedal configured to be rotatable in an accelerator opening direction by a pedaling force of the pad; an arm connecting the pedal to the pad; and a biasing member configured to bias the pedal in an accelerator closing direction via the arm.

The arm has a shaft portion assembled to the pad, and the pad has a pair of support walls configured to rotatably support the shaft portion. The pair of support walls have wall surfaces facing each other. Each of the wall surfaces facing each other is provided with a bearing portion in which the shaft portion is fitted, and a thickening portion which makes a root side of the support wall thicker than a tip side of the support wall. The thickening portion includes a curved surface or a slope surface having a surface area that is broader as a distance from the bearing portion increases.

BRIEF DESCRIPTION OF THE DRAWINGS

The above and other objects, features and advantages of the present disclosure will become apparent from the following detailed description taken in conjunction with the accompanying drawings. In the drawings:

FIG. 5A is a plan view of a support wall of the first embodiment;

DESCRIPTION OF EMBODIMENTS

Figure 1:
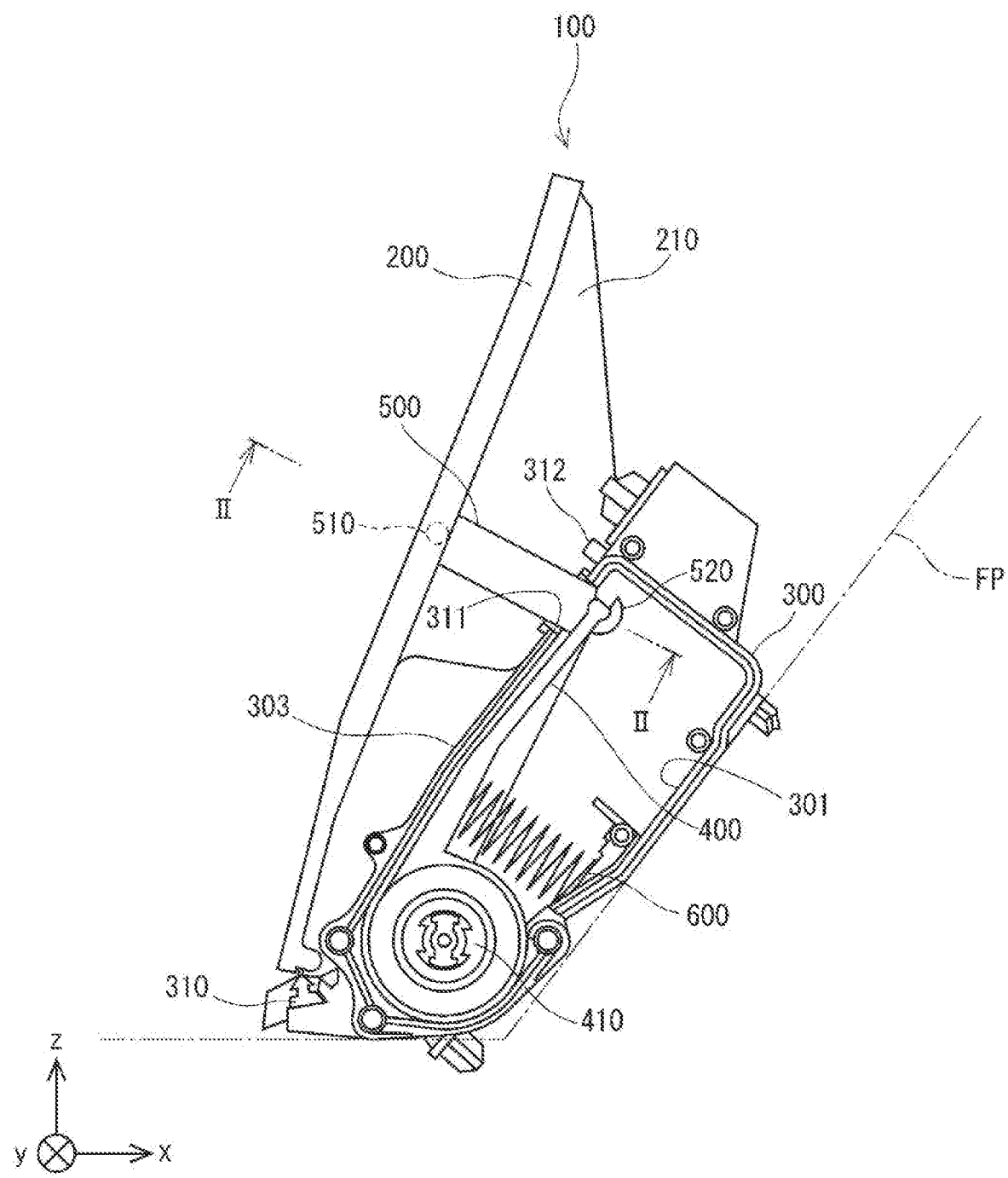
FIG. 1 is a side view of an accelerator device showing a first embodiment.

When assembling an accelerator device, a pad is rotatably or movably connected to one end of the arm. At this timing, the one end of the arm may be press-fitted between a pair of support walls that are provided on the pad, and the support walls may be made to be elastically deformed. However, when the support wall has high rigidity, the support wall may break due to stress concentration caused by an assembling load. Therefore, the thickness of the support wall is reduced to facilitate elastic deformation. However, an assembly strength of the support wall after assemblage needs to be guaranteed to bear a pull-up load applied to the pad, since a load to pull up the pad is applied thereto after assemblage.

It is an object of the present disclosure to provide an accelerator device (i) capable of preventing breakage of a support wall due to an assembly load when assembling a pad and an arm and (ii) increasing an assembly strength against a pull-up load.

An accelerator device according to an exemplar of the present disclosure includes a pad configured to be stepped on by a driver, a pedal configured to be rotatable in an accelerator opening direction by a pedaling force of the pad; an arm connecting the pedal to the pad; and a biasing member configured to bias the pedal in an accelerator closing direction via the arm.

The arm has a shaft portion assembled to the pad, and the pad has a pair of support walls configured to rotatably support the shaft portion. The pair of support walls have wall surfaces facing each other. Each of the wall surfaces facing each other is provided with a bearing portion in which the shaft portion is fitted, and a thickening portion which makes a root side of the support wall thicker than a tip side of the support wall. The thickening portion includes a curved surface or a slope surface having a surface area that is broader as a distance from the bearing portion increases.

In the accelerator device of the above exemplar of the present disclosure, since the root portion of the support wall becomes thicker than the tip portion by the thickening portion, the rigidity of the root side is increased without lowering the elasticity of the tip side. Further, since the curved surface or the slope surface is formed on the thickening portion and the surface area thereof becomes broader as the distance from the bearing portion increases, a stress at the time of assembly is dispersed in a region away from the bearing portion where a surface area dimension of such region is made broader. Therefore, the stress concentration in the vicinity of the bearing portion is reduced with the broader surface area. Thus, when assembling the pad and the arm, it is possible (i) to prevent the support wall from being broken by the assembly load and (ii) to increase the assembly strength against the pull-up load of the pad.

Hereinafter, multiple embodiments for performing the present disclosure will be described with reference to the drawings. In each embodiment, portions corresponding to those described in the preceding embodiment are denoted by the same reference numerals, and overlapping descriptions may be omitted. In a case where only a part of a configuration is described in each embodiment, the other embodiments described above are capable of being applied for the other parts of the configuration. Not only a combination of parts that clearly indicate that the combination is possible in each embodiment, but also a partial combination of embodiments even if the combination is not specified is also possible when there is no problem in the combination.

First Embodiment

The first embodiment of the present disclosure will be described with reference to FIGS. 1 to 8. As shown in FIG. 1, an accelerator device 100 of the first embodiment is disposed on a floor panel FP of a vehicle body. In FIG. 1, the x-axis indicates a vehicle traveling direction, the y-axis indicates a vehicle width direction, and the z-axis indicates a vertically upward direction. The x, y, and z axes in other figures described later also show the same directions as in FIG. 1. Hereinafter, unless otherwise specified, the shape or configuration of the accelerator device 100 in a state disposed in a vehicle body will be described. For example, an "upward direction" or an "upper part" means an upward direction or an upper part of the accelerator device 100 in a state where the accelerator device 100 is disposed in the vehicle body.

The accelerator device 100 includes a pad 200 that is stepped on by a driver, a case 300 that is attached to the floor panel FP, a pedal 400 that rotates in an accelerator opening direction by a pedaling force of the pad 200, and an arm 500 that connects the pedal 400 and the pad 200, a spring 600 as a biasing member that biases the pedal 400 in an accelerator closing direction. The pad 200 is rotatably supported by a fulcrum portion 310 of the case 300 at a lower end of the pad 200. A protective wall 210 that closes a gap between the pad 200 and the case 300 is provided on a side surface of the pad 200 so that the driver's feet are not pinched.

The pedal 400 and the spring 600 are arranged inside the case 300, the pedal 400 is rotatably supported by a support shaft 410, and the spring 600 is interposed between the pedal 400 and an inner wall surface 301 of the case 300. The case 300 is provided with a partition wall 303 at a position between the pad 200 and the pedal 400, and the partition wall 303 has an opening 311 through which the arm 500 penetrates, and a full open stopper 312 for stopping the pad 200 at an accelerator fully-opened position. A structure in which the pedal 400 is connected to the pad 200 via the arm 500 is called as an "organ pedal structure" among those skilled in the art.

Figure 2:
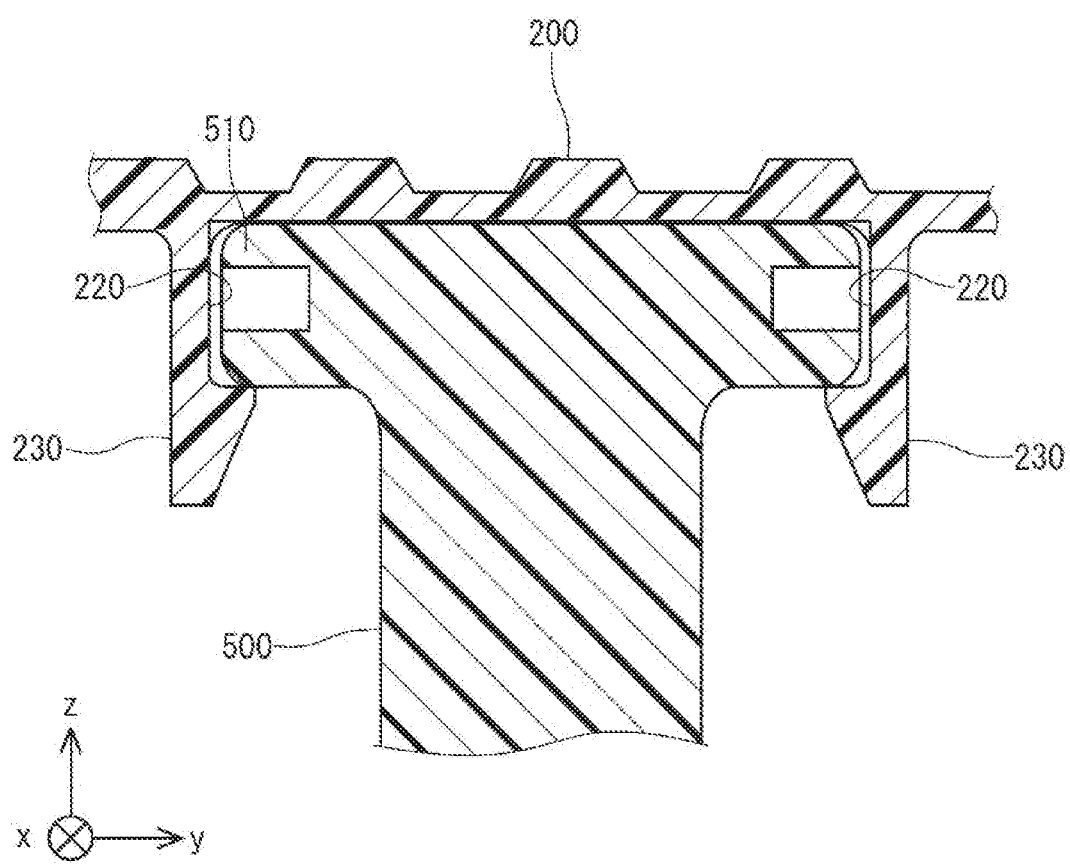
FIG. 2 is a cross-sectional view taken along a line II-II of FIG. 1.
Figure 3A:
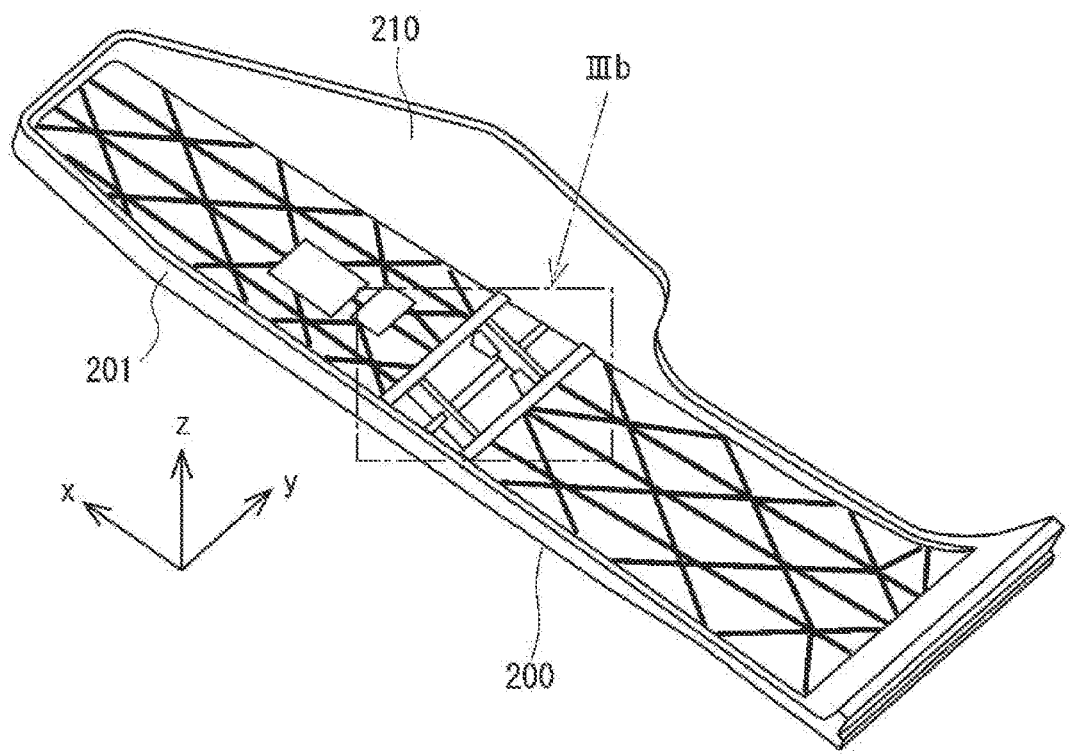
FIG. 3A is a perspective view of a pad as viewed from a back side.
Figure 3B:
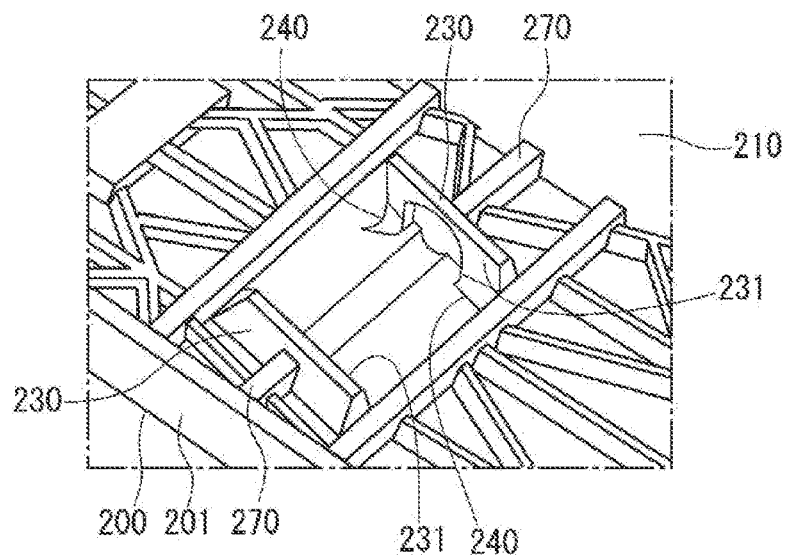
FIG. 3B is an enlarged view of a part IIIb of FIG. 3A.

The arm 500 includes a shaft portion 510 assembled to an intermediate portion in a longitudinal direction of the pad 200, and a hooking portion 520 to be hooked to a tip end portion of the pedal 400. As shown in FIG. 2, the shaft portion 510 is integrally provided at a tip of the arm 500 made of resin, to project on both sides of the pad 200 in the width direction (i.e., y-axis direction). As shown in FIGS. 3A and 3B, the pad 200 has a pair of support walls 230 that rotatably support the shaft portion 510. Each of the support walls 230 projects from a back surface of the pad 200 made of resin to face each other in the width direction of the pad 200.

Figure 4:
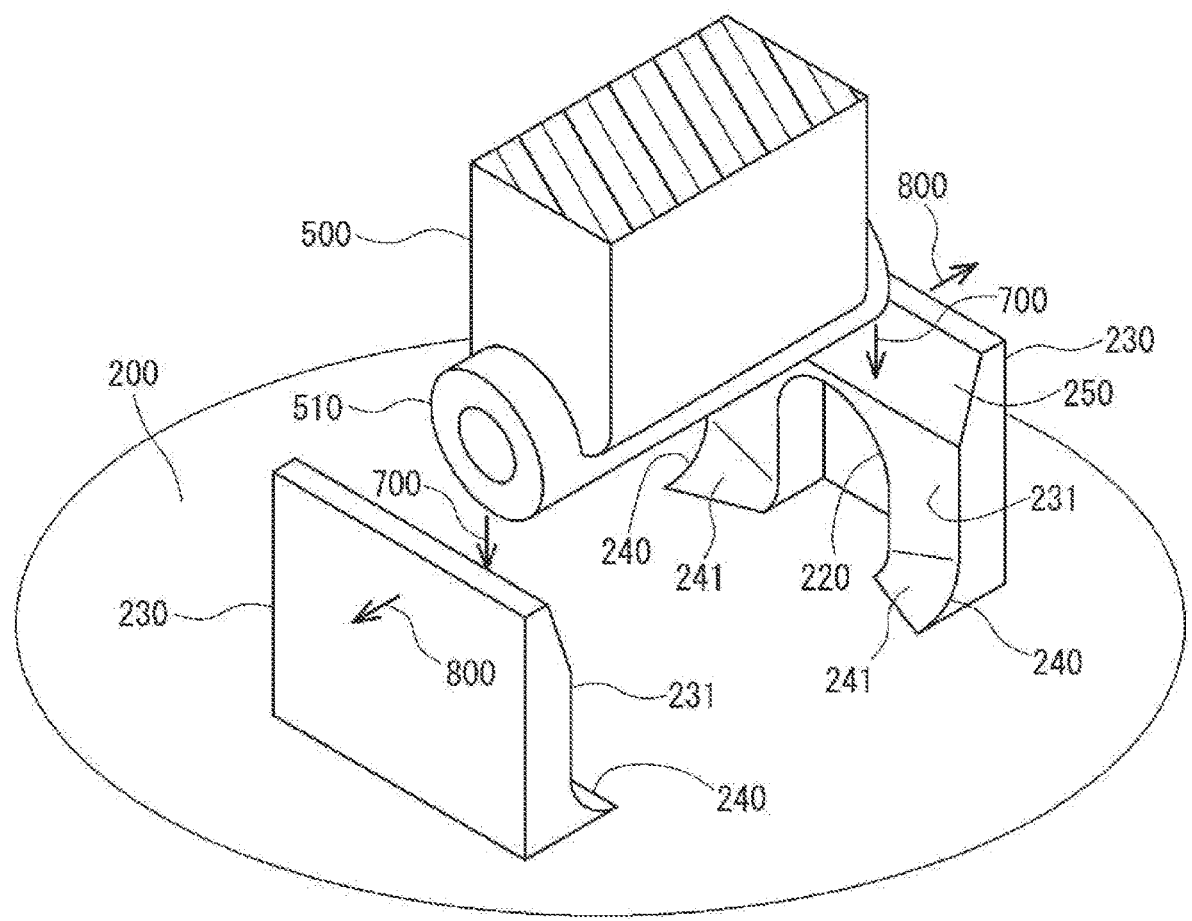
FIG. 4 is a perspective view showing an assembly structure of the pad and an arm.
Figure 5B:
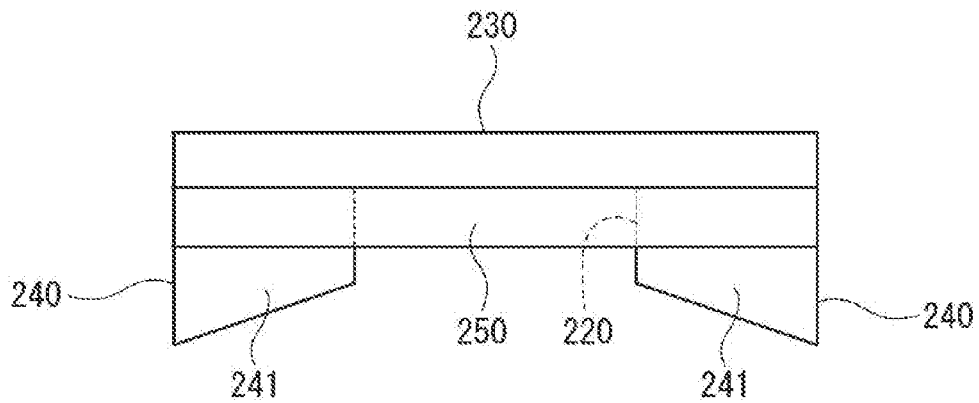
FIG. 5B is a front view of the support wall of the first embodiment.
Figure 5B:
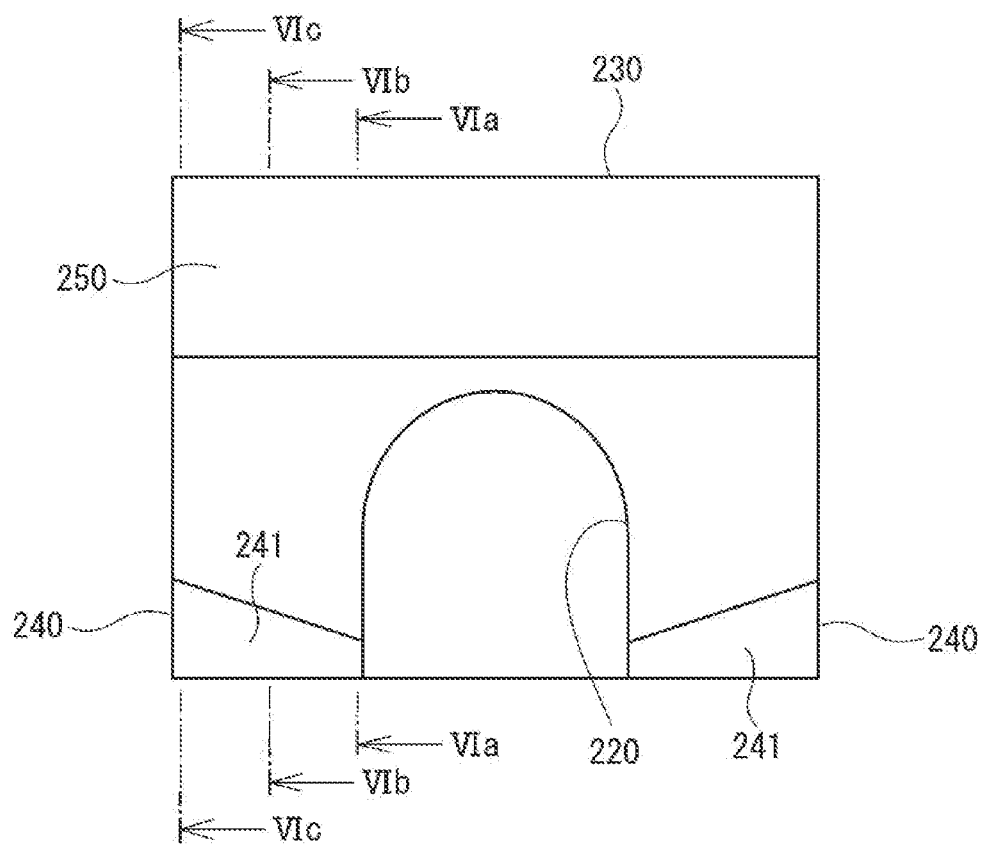

As shown in FIGS. 4, 5A, and 5B, a bearing portion 220 is formed on a facing wall surface 231 of each of the support walls 230 to which the shaft portion 510 of the arm 500 is press-fitted at the time of assembly. The bearing portion 220 is provided as a recess in a central portion in the width direction of the support wall 230, and thickening portions 240 are formed on both sides of the bearing portion 220. The thickening portion 240 is formed in such a shape that the support wall 230 has the wall thickness thicker at a base portion than at a tip portion. In such manner, the root portion of the support wall 230 obtains rigidity that can withstand an assembly load, and the tip portion of the support wall 230 exhibits elasticity that allow deformation according to the assembly load.

Figure 6A:
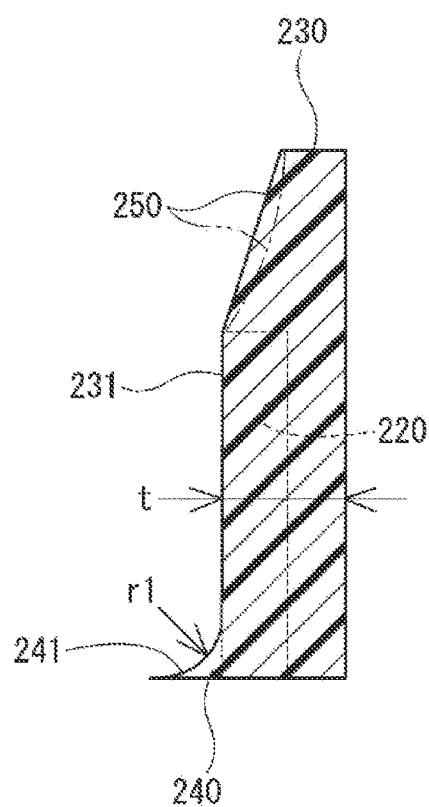
FIG. 6A is a cross-sectional view taken along a line VIa-VIa of FIG. 5B.
Figure 6B:
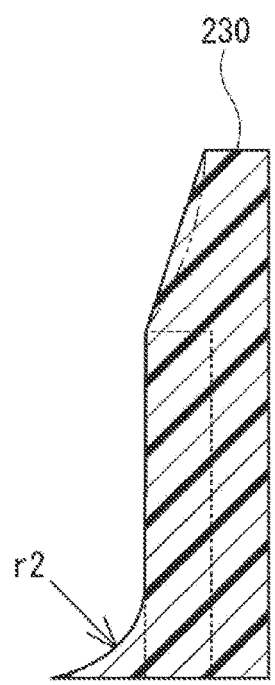
FIG. 6B is a cross-sectional view taken along a line VIb-VIb of FIG. 5B.
Figure 6C:
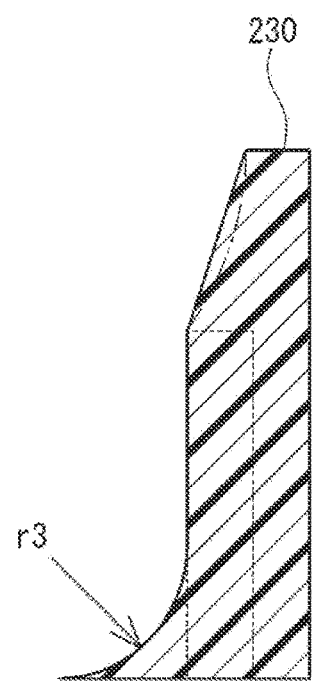
FIG. 6C is a cross-sectional view taken along a line VIc-VIc of FIG. 5B.

The thickening portion 240 of the present embodiment includes a curved surface (concave curved surface) 241 whose surface area dimension increases as a distance from the bearing portion 220 increases in the width direction of the support wall 230. That is, in the thickening portion 240, the root portion of the facing wall surface 231 of the pair of support walls 230 is chamfered to form a curved surface 241, so that a radius of the curved surface 241 is continuously changed to be smaller (r1) at a portion closer to the bearing portion 220, to be greater (r3) at a portion farther from the bearing portion 220 (r3), and to have an intermediate value (r2) at an intermediate portion (r1<r2<r3), as shown in FIGS. 6A to 6C. Described quantitatively, the radius (r) of the curved surface 241 may preferably be changed continuously in a range of 0.5 to 2.0 times of the wall thickness (t) at an intermediate height position of the support wall 230 (r=0.5t to 2.0t).

Further, the facing wall surfaces 231 of the pair of support walls 230 are each provided with a slope surface 250 that guides the shaft portion 510 to the bearing portion 220 at the time of assembly. As shown in FIGS. 6A to 6C, the slope surface 250 is formed in an ascending slope so that the wall thickness at an upper end of the support wall 230 is minimized. The slope surface 250 is not limited to a flat surface as shown by a solid line in FIGS. 6A to 6C, and may also be a concave curved surface as shown by a two-dot chain line in the same figure.

When assembling the pad 200 and the arm 500 in the accelerator device 100 configured as described above, as shown in FIG. 4, (i) the arm 500 is press-fitted to a position between the pair of support walls 230 from above the pad 200 as shown in FIG. 4 in a press-fitting direction 700, (ii) the support wall 230 is elastically deformed in a deformation direction 800, (iii) and the shaft portion 510 is fitted to the bearing portion 220. At such timing, since the thickening portion 240 makes the wall thickness of the support wall 230 thicker on a root side than on a tip side, the rigidity of the support wall 230 on the root side can be increased without impairing the elasticity on the tip side. Therefore, the support wall 230 can be prevented from being broken, and the shaft portion 510 can be easily assembled to the bearing portion 220.

Figure 7A:
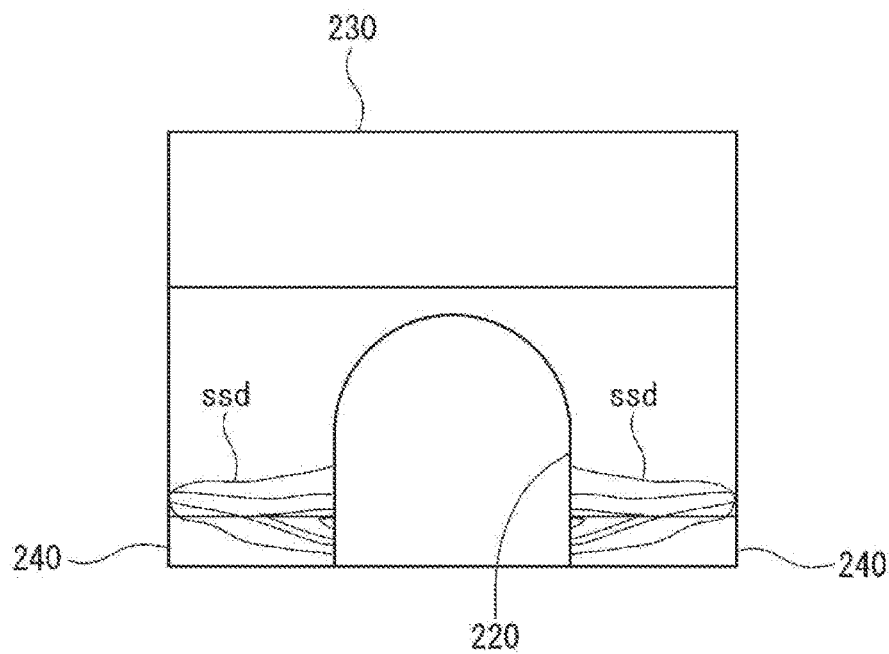
FIG. 7A is a stress dispersion diagram of a support wall root portion of a comparative example.
Figure 7B:
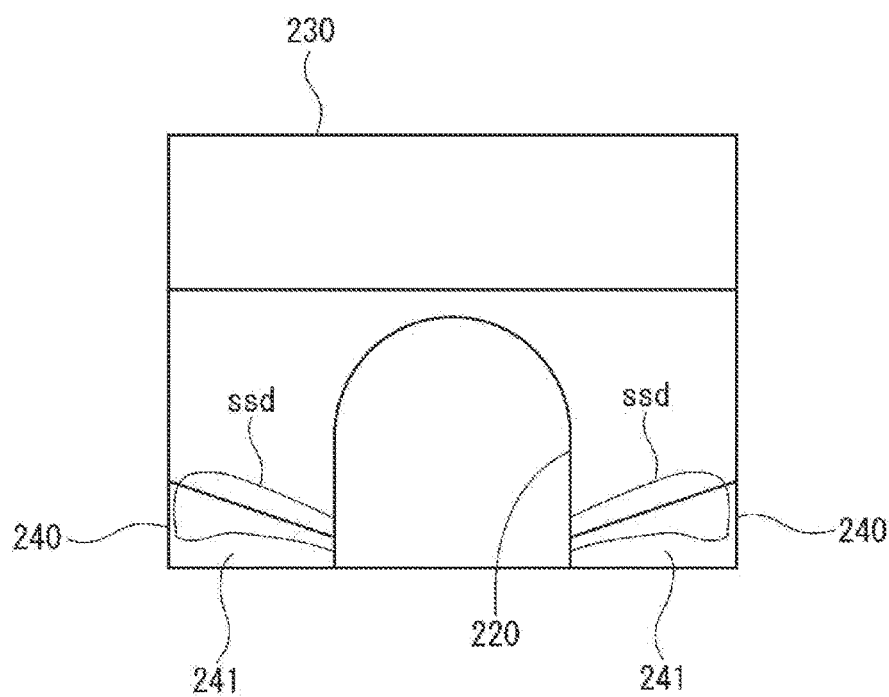
FIG. 7B is a stress dispersion diagram of a support wall root portion of the first embodiment.
Figure 8:
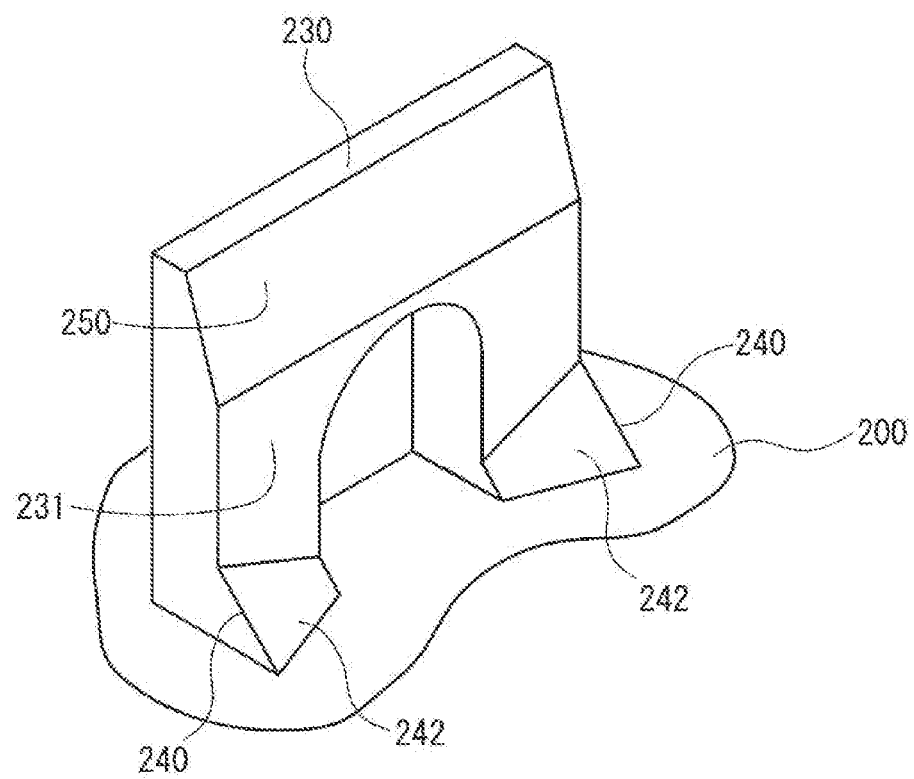
FIG. 8 is a perspective view showing a modified example of the support wall.

Further, since the surface area of the thickening portion 240 is broadened as the curved surface 241 extends away from the bearing portion 220, the stress concentration at the root portion of the support wall 230 is relaxed. FIGS. 7A and 7B schematically show the stress dispersion at the time of assembly by the stress curve ssd. In the support wall 230 of a comparative example shown in FIG. 7A, the surface area dimension of the thickening portion 240 is formed to be constant in each portion of the support wall 230 in the width direction. Therefore, stress is concentrated at the root portion of the support wall 230, centering on a portion where an upper edge of the thickening portion 240 intersects with the bearing portion 220.

On the other hand, in a case of the present embodiment shown in FIG. 7B, the stress is dispersed over a wide area as the distance from the bearing portion 220 increases in accordance with the change in the surface area dimension of the thickening portion 240, thereby reducing the stress concentration.

Therefore, according to the accelerator device 100 of the present embodiment, the support wall 230 can be prevented from being broken due to stress concentration, and fitting of the shaft portion 510 and the bearing portion 220 can be firmly maintained for a long period of time against the pad pull-up load by the spring 600 in an enduring manner. Further, since the support wall 230 is provided with the slope surface 250 on the upper side of the bearing portion 220, the support wall 230 is gradually deformed at the time of assembly, and the shaft portion 510 is smoothly fitted to the bearing portion 220, thereby improving assemblability of the pad 200 and the arm 500.

The surface area dimension of the thickening portion 240 can be changed, not by the curved surface 241, but by a slope. In a modified example of the first embodiment shown in FIG. 8, a flat slope 242 is provided on the thickening portion 240. Similar to the curved surface 241, the slope 242 is formed so that the surface area dimension increases as the distance from the bearing portion 220 increases. This shape also reduces the stress concentration on the root portion, prevents the support wall 230 from being broken, and can increase the assembly strength against the pad pull-up load.

Second Embodiment

Figure 9A:
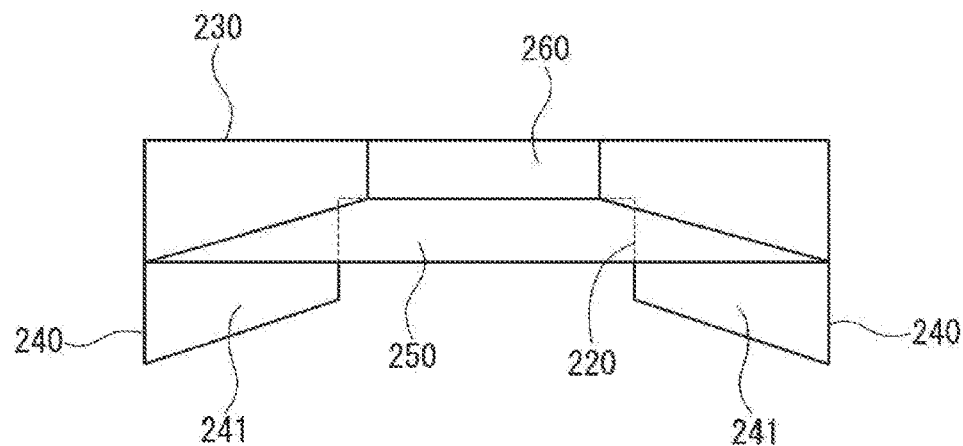
FIG. 9A is a plan view of a support wall of a second embodiment.
Figure 9B:
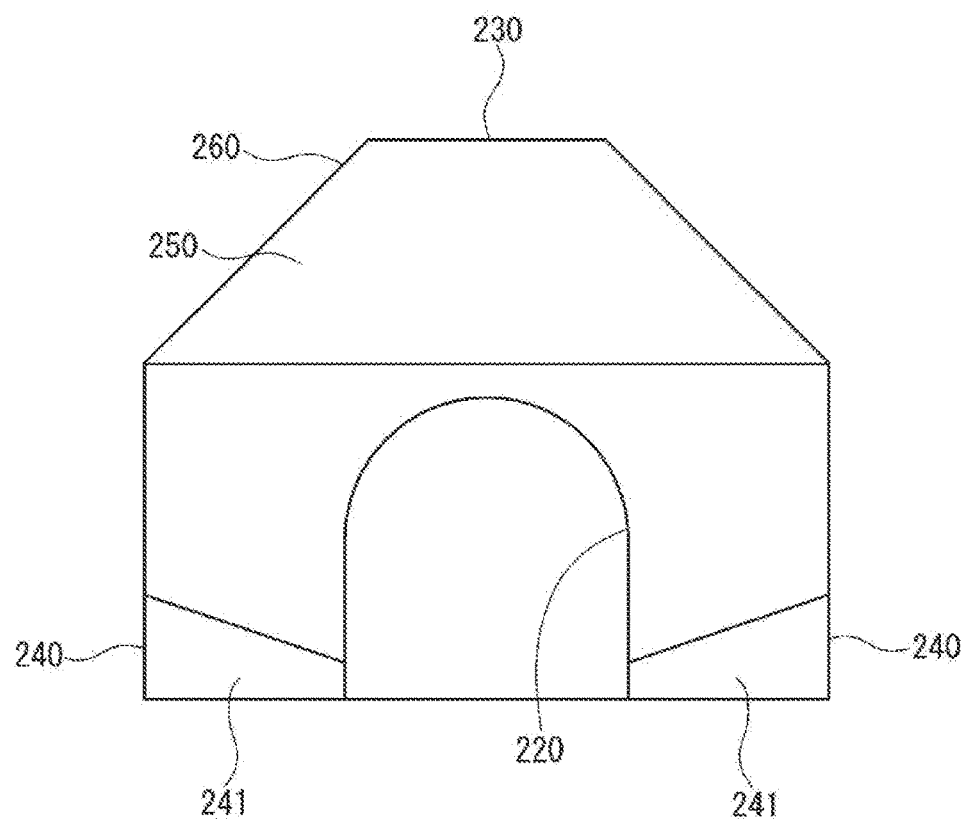
FIG. 9B is a front view of the support wall of the second embodiment.
Figure 10:
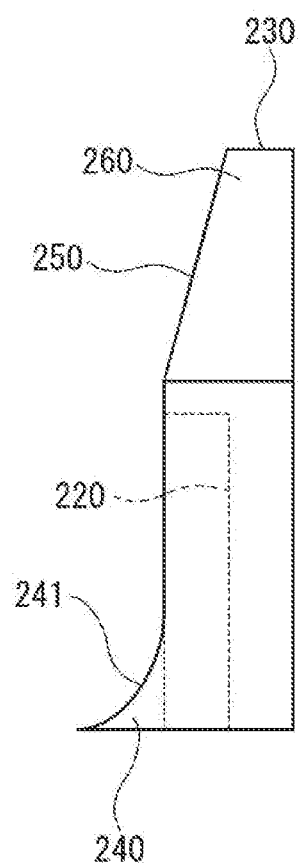
FIG. 10 is a right side view of the support wall of the second embodiment.
Figure 11:
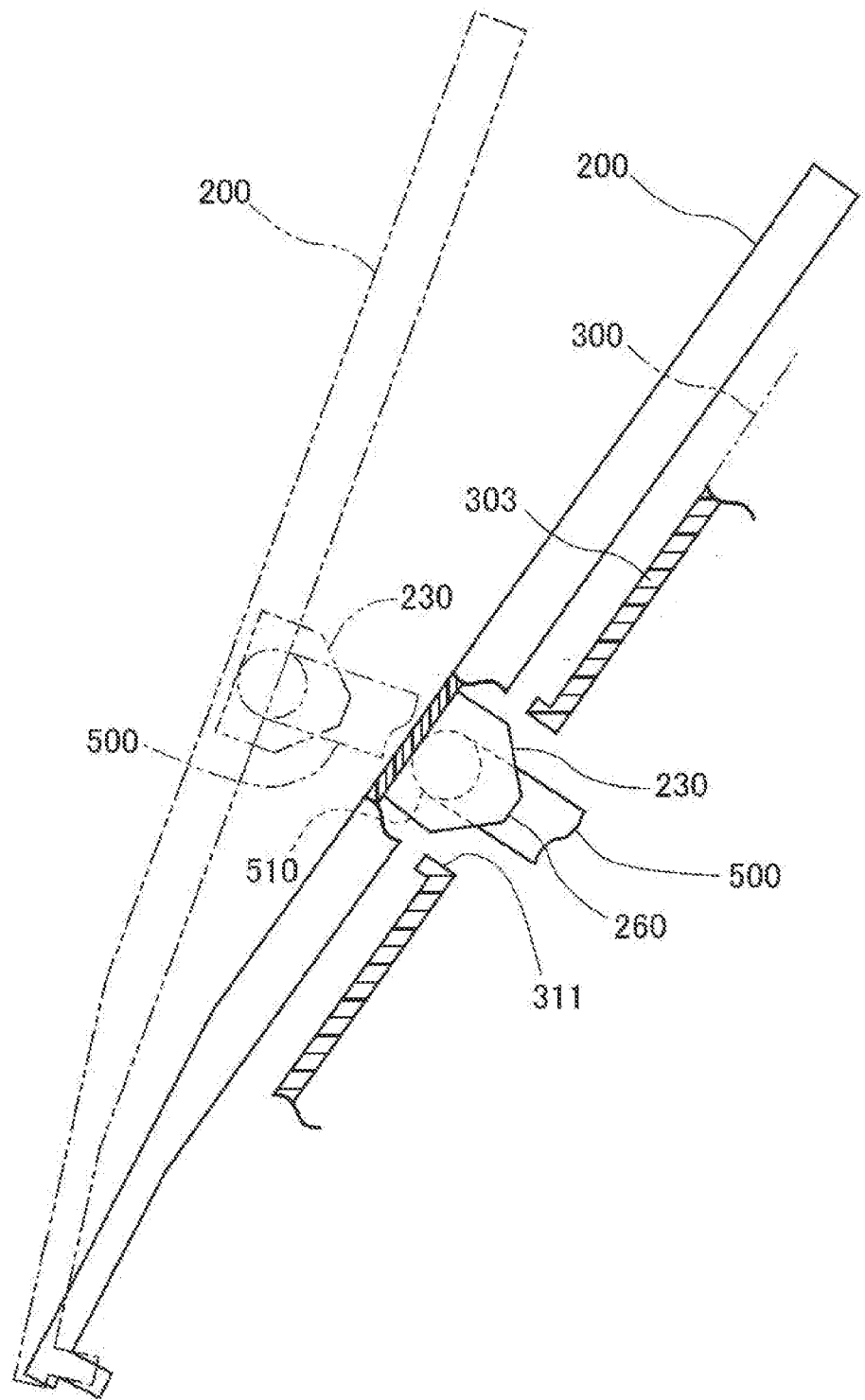
FIG. 11 is a side view of the pad showing an operation of the support wall of the second embodiment.

An accelerator device 100 (see FIG. 1) of the second embodiment is different from the first embodiment in the shape of the support wall 230. As shown in FIGS. 9A, 9B, and 10, in the second embodiment, two shoulder parts of the support wall 230 are cut off, and a narrowing tip portion 260 is formed in the center area of the support wall 230 in the width direction. Then, as shown in FIG. 11, when the pad 200 is stepped on to the accelerator fully opened position, the narrowing tip portion 260 is fitted in the opening 311 formed in the partition wall 303 of the case 300. According to such a configuration, it is possible to take a large stepping stroke of the pad 200 without being hindered by the two shoulder parts of the support wall 230.

Third Embodiment

Figure 12A:
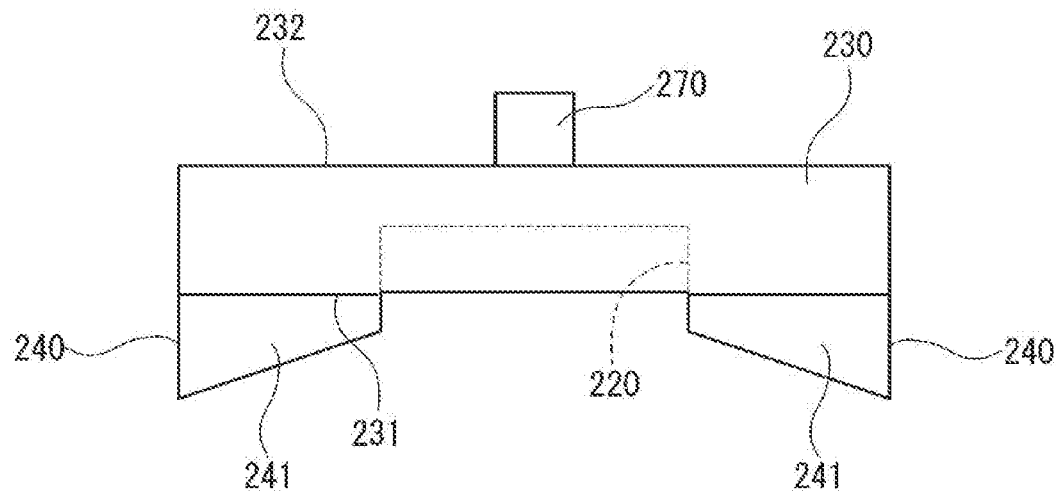
FIG. 12A is a plan view of a support wall of a third embodiment.
Figure 12B:
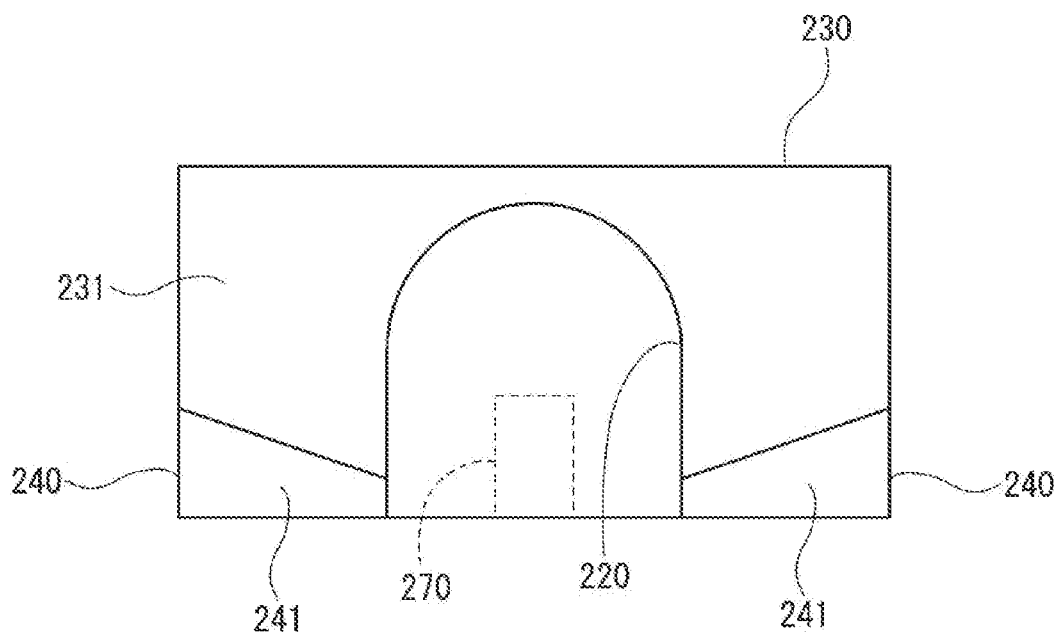
FIG. 12B is a front view of the support wall of the third embodiment.
Figure 13:
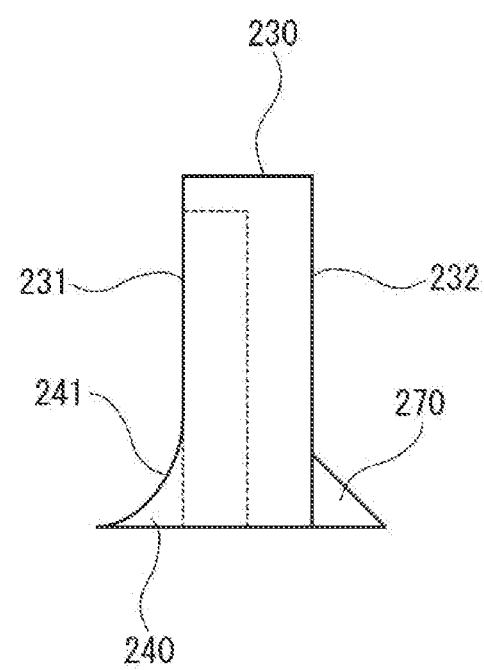
FIG. 13 is a right side view of the support wall of the third embodiment.

In an accelerator device 100 (see FIG. 1) of the third embodiment, as shown in FIGS. 12A, 12B, and 13, a rib 270 is provided on a wall surface 232 opposite to the thickening portion 240 of the support wall 230. The rib 270 is formed to extend at a position between the pad 200 and the support wall 230. According to such a configuration, the rigidity of the support wall 230 can be further strengthened by the rib 270, and the assembly strength with respect to the load in the pad pull-up direction can be further increased. As shown in FIG. 3B, the rib 270 may also be formed to extend at a position between the support wall 230 and a border portion 201 or the protective wall 210 of the pad 200.

Other Embodiments

In each of the above embodiments, the accelerator device 100 is provided to have an "organ pedal structure." However, in other embodiments, it can be modified as an accelerator device other than the one having the "organ pedal structure." For example, the present disclosure can be applied to an accelerator device having a structure in which a pad suspended from a part around the driver's feet is connected to a pedal via an arm.

In addition, the present disclosure is not limited to each of the above embodiments, and the shape or configuration of each part may be appropriately changed and implemented without departing from the spirit of the present disclosure.

The present disclosure has been made in accordance with the embodiments. However, the present disclosure is not limited to such an embodiments and configurations. The present disclosure also encompasses various modifications and variations within the scope of equivalents. Furthermore, various combinations and formations, and other combinations and formations including one other element added thereto or one existing element subtracted therefrom, with the number of addition/subtraction not necessarily limited to one, may also be encompassed in the present disclosure.

What is claimed is:

1. An accelerator device comprising:
    a pad configured to be stepped on by a driver;
    a pedal configured to be rotatable in an accelerator opening direction by a pedaling force of the pad;
    an arm connecting the pedal to the pad; and
    a biasing member configured to bias the pedal in an accelerator closing direction via the arm, wherein
    the arm has a shaft portion assembled to the pad,
    the pad has a pair of support walls configured to rotatably support the shaft portion,
    the pair of support walls have wall surfaces facing each other,
    each of the wall surfaces facing each other is provided with a bearing portion in which the shaft portion is fitted, and a thickening portion which makes a side of a root end of the support wall thicker than a side of a tip end of the support wall,
    the thickening portion includes a curved surface or a slope surface having a surface area that is broader as a distance from the bearing portion increases,
    the thickening portion extends toward the side of the tip end, from the root end to a predetermined thickening position, and
    a thickness of the thickening portion increases gradually from the predetermined thickening position to the root end in the thickening portion.

2. The accelerator device according to claim 1, wherein the wall surface of the support wall is provided with a slope surface guiding the shaft portion to the bearing portion at an assembly time.

3. The accelerator device according to claim 1, further comprising
    a partition wall provided between the pad and the pedal, wherein
    the partition wall has an opening through which the arm penetrates, and the support wall includes a narrowing tip portion fitted into the opening when the pad is pedaled to a fully opened position.

4. The accelerator device according to claim 1, wherein the support wall includes a rib protruding from a wall surface which is an opposite surface of the support wall having the thickening portion.

5. The accelerator device according to claim 1, wherein each of the wall surfaces of the support walls is provided with a slope surface to guide the shaft portion to the bearing portion at an assembly time, the slope surface extends from the tip end of the support wall to a predetermined slope position, and a thickness of the support wall with the slope surface reduces gradually from the predetermined slope position to the tip end.

6. The accelerator device according to claim 1, wherein:

the thickening portion includes the curved surface; and a radius of the curved surface is continuously changed to be smaller at a portion closer to the bearing portion and greater at a portion farther from the bearing portion.

7. The accelerator device according to claim 1, wherein each of the wall surfaces of the support walls is provided with a concave curved surface to guide the shaft portion to the bearing portion at an assembly time.

\* \* \* \* \*